(12) United States Patent
Lagnado et al.

(10) Patent No.: US 12,401,969 B2
(45) Date of Patent: Aug. 26, 2025

(54) BEACON TRANSMISSION

(71) Applicant: HEWLETT-PACKARD DEVELOPMENT COMPANY, L.P., Spring, TX (US)

(72) Inventors: Isaac Lagnado, Spring, TX (US); Charles J Stancil, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 444 days.

(21) Appl. No.: 17/995,951

(22) PCT Filed: Apr. 17, 2020

(86) PCT No.: PCT/US2020/028709
§ 371 (c)(1),
(2) Date: Oct. 11, 2022

(87) PCT Pub. No.: WO2021/211135
PCT Pub. Date: Oct. 21, 2021

(65) Prior Publication Data
US 2023/0204703 A1    Jun. 29, 2023

(51) Int. Cl.
*H04W 4/029* (2018.01)
*H04W 4/80* (2018.01)
*H04W 12/06* (2021.01)
*H04W 12/08* (2021.01)

(52) U.S. Cl.
CPC ............. *H04W 4/029* (2018.02); *H04W 4/80* (2018.02); *H04W 12/06* (2013.01); *H04W 12/08* (2013.01)

(58) Field of Classification Search
CPC ............ H04W 4/029; G01S 1/04; G01S 1/68; G01S 1/0428
See application file for complete search history.

(56) References Cited

U.S. PATENT DOCUMENTS

| | | | |
|---|---|---|---|
| 8,745,213 B2* | 6/2014 | Dare | H04L 41/5041 |
| | | | 709/224 |
| 8,847,754 B2 | 9/2014 | Buchheim et al. | |
| 9,025,503 B2 | 5/2015 | Manssour | |
| 9,654,909 B2 | 5/2017 | Helms et al. | |
| 9,866,389 B2 | 1/2018 | Reed et al. | |
| 2016/0095047 A1 | 3/2016 | Lee et al. | |
| 2017/0163293 A1 | 6/2017 | Lee et al. | |
| 2020/0091608 A1 | 3/2020 | Alpman et al. | |

FOREIGN PATENT DOCUMENTS

WO      2018/200208 A1    11/2018

\* cited by examiner

*Primary Examiner* — Tuan H Nguyen
(74) *Attorney, Agent, or Firm* — Quarles & Brady LLP (57) ABSTRACT

Examples of electronic devices are described herein. In some examples, an electronic device includes a transmitter. In some examples, the transmitter may transmit a first beacon and a second beacon. In some examples, the first beacon may be associated with a first account. In some examples, the second beacon may be associated with a second account. In some examples, the first account includes a different beacon control privilege relative to the second account.

15 Claims, 4 Drawing Sheets

BEACON TRANSMISSION

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, smart appliances, vehicles with electronic components, aircraft, drones, robots, smart appliances, tracking devices, etc.

A tracking device may be a device to provide location and/or tracking functionality. For example, a tracking device may utilize wireless signaling to indicate a current and/or past location of the tracking device. In some examples, a tracking device may transmit a signal (e.g., beacon, advertisement signal, etc.) that may indicate a location of the tracking device and/or may indicate a proximity of the tracking device to a receiving device.

In some examples of the electronic devices described herein, a tracking device and/or other wireless communication device (e.g., Internet of Things (IoT) device) may be included in and/or integrated into a host device. A host device may be a device that includes an electronic device or devices (e.g., a tracking device). The tracking device and/or other wireless communication device may be utilized to track, locate, and/or send a signal from the host device.

Some examples of the techniques described herein may enable transmitting multiple beacons for separate accounts. For example, a tracking device may allow a user to locate and/or track a device that has become lost. In some approaches, tracking devices may be utilized for an individual user or account, where one account may be associated with the tracking device. It may be beneficial to provide tracking devices for administrative (e.g., company, corporation, information technology decision maker (ITDM), etc.) and subordinate (e.g., end-user, consumer, etc.) uses. For example, a notebook device with an integrated tracking device may be accessed through a subordinate account and through an administrative account. In some examples, the accounts may be independent from the perspective of allowing independent access to status and/or feature (e.g., tracking) functionality. In some examples, an administrative account may have a privilege to enable or disable beaconing corresponding to the subordinate account. This may beneficially provide improved security of the tracking device and/or a host device for the administrative account, and/or may beneficially allow an administrative account to maintain control of the tracking device and/or host device. Some examples of the techniques described herein may enable wireless signaling that beacons with first account information (e.g., administrative account information) and that beacons with second account information (e.g., subordinate account information). Some examples of the techniques described herein may enable one device to beacon for different accounts.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

Figure 1:
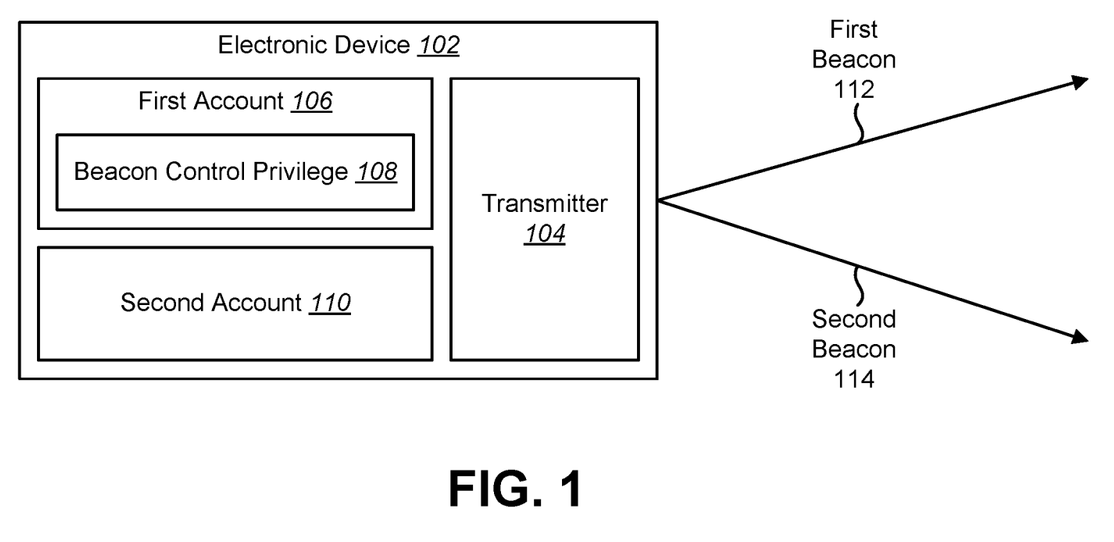
FIG. 1 is a block diagram of an example of an electronic device that may be utilized for beacon transmission.

FIG. 1 is a block diagram of an example of an electronic device 102 that may be utilized for beacon transmission. Examples of the electronic device 102 may include tracking devices, computing devices, laptop computers, desktop computers, smartphones, tablet devices, wireless communication devices, game consoles, vehicles with electronic components, aircraft, drones, robots, smart appliances, etc. In some examples, the electronic device 102 may be included in a host device. For instance, the electronic device 102 may be a tracking device that is included in a laptop computer as a host device. In some examples, the electronic device 102 may perform one, some, or all of the functions, operations, elements, procedures, etc., described in one, some, or all of FIG. 1-4.

The electronic device 102 may include circuitry (e.g., integrated circuitry, semiconductor circuitry, electronic component(s), etc.). For example, the electronic device 102 may include digital logic circuitry (e.g., a processor), transistors, memory, etc. In some examples, the electronic device 102 may execute instructions and/or code to perform an operation or operations.

The electronic device 102 may include a transmitter 104. For instance, the electronic device 102 may include a transmitter 104 to transmit a wireless signal or signals (e.g., beacons, advertising signal(s), etc.). For example, the wireless signal or signals may be utilized by another device (e.g., a paired device) to detect, locate, and/or record a location for the electronic device 102. For instance, the other device (e.g., paired device) may detect when the electronic device 102 is within wireless range and/or may store location data (e.g., global positioning system (GPS) data of the paired device) associated with the electronic device 102 when the electronic device 102 is within wireless range.

The transmitter 104 may transmit a first beacon 112 and/or a second beacon 114. A beacon may be a wireless signal (e.g., radio frequency (RF) signal, electromagnetic signal, etc.). For example, a beacon may provide an indication of electronic device 102 presence, location, and/or activity. In some examples, the electronic device 102 (e.g., transmitter 104) may include or may be coupled to an antenna or antennas. The transmitter may utilize the antenna(s) to transmit (e.g., radiate) wireless signals (e.g., the first beacon 112 and/or the second beacon 114). In some examples, a beacon may be transmitted repeatedly and/or periodically. In some examples a beacon may be transmitted according to a schedule. In some examples, a first beacon and a second beacon may be transmitted in parallel (e.g., concurrently, in overlapping time periods) using different frequency bands, encoding, protocols, and/or radio access technologies (e.g., Wi-Fi, Bluetooth, Long Term Evolution (LTE), 5G, etc.). In some examples, a first beacon and a second beacon may be transmitted at different times (e.g., in a temporal sequence).

In some examples, the first beacon 112 may be associated with a first account 106 and/or the second beacon 114 may be associated with a second account 110. An account may be information associated with an entity (e.g., user, ITDM, administrator, company, and/or corporation, etc.). In some examples, the first account 106 and the second account 110 may be stored in memory of the electronic device 102. In some examples, the first account 106 may correspond to an administrative account (e.g., company account, corporate account, ITDM account, etc.). In some examples, the second account 110 may correspond to a user account (e.g., employee account, subordinate account, customer account, etc.). In some examples, the first beacon 112 may correspond to, may be sent for, and/or may include information from the first account 106. In some examples, the second beacon 114 may correspond to, may be sent for, and/or may include information from the second account 110.

In some examples, an account may include and/or indicate an identifier or identifiers (e.g., device identifier, entity identifier, etc.). For instance, an identifier may be utilized to identify a device associated with the account and/or an entity (e.g., user, ITDM, administrator, company, corporation, etc.) associated with the account. An identifier may be expressed as a number or numbers, character(s), text, digital code, etc. In some examples, the first beacon 112 may include a first device identifier. The first device identifier may be included in and/or indicated by the first account 106. In some examples, the second beacon 114 may include a second device identifier. The second device identifier may be included in and/or indicated by the second account 110. In some examples, the first device identifier and the second device identifier may be different. For instance, the first beacon 112 may include a first device identifier and the second beacon 114 may include a second device identifier that is different from the first device identifier. For example, the first device identifier may be a different number, code, character string, etc., relative to the second device identifier. In some examples, the different device identifiers may enable the electronic device 102 (e.g., one electronic device) to appear as different devices (e.g., a first device associated with the first account 106 and a second device associated with the second account 110) to a remote device or devices that receive(s) the first beacon 112 and/or the second beacon 114.

In some examples, the first beacon 112 may include different information relative to the second beacon 114. For instance, the first beacon 112 may include a different device identifier than the second beacon 114 as described above. In some examples, the first beacon 112 may indicate an input and output instruction (e.g., basic input/output system (BIOS)) version. An input and output instruction version may be an indicator of a version of input and/or output instructions utilized by the electronic device 102 to operate. For instance, the input and output instructions may be instructions that enable the electronic device 102 to operate (e.g., that allow different electronic device components to interoperate). In some examples, the second beacon 114 may be transmitted without an input and output instruction version.

In some examples, an account may include and/or indicate a privilege or privileges. A privilege may be a capability to perform an operation and/or to access information on the electronic device 102. For instance, the electronic device 102 may perform an operation if a command or request is associated with an account that includes or indicates a privilege to perform the operation. Some examples of privileges may include a locating privilege, a beacon control privilege, a sounding privilege, a locking privilege, a wiping privilege, an input and output instruction modification privilege, and/or an encryption privilege. In some examples, a privilege or privileges may be the same for the first account 106 and the second account 110. In some examples, a privilege or privileges may be different for the first account 106 and the second account 110.

A locating privilege may be a capability to control whether a locating function is enabled or disabled for an account of the electronic device 102 and/or a host device that includes the electronic device 102. For example, the locating function for the electronic device 102 and/or a host device may be enabled to allow another device or devices to receive and/or transmit location information of the electronic device 102 and/or a host device. Disabling the locating function may disable sending information and/or permission to allow other device(s) to receive and/or transmit location information of the electronic device 102 and/or the host device. In some examples, the electronic device 102 and/or a host device may enable or disable the locating function in response to a command, instruction, or request associated with an account that includes a locating privilege. In some examples, the first account 106 may include a different locating privilege relative to the second account 110. For instance, the first account 106 may include a locating privilege without the second account 110 including a locating privilege.

A beacon control privilege may be a capability to control (e.g., enable, disable, and/or modify) a beacon for an account. For instance, a beacon control privilege may be a capability to control whether a beacon is enabled or disabled from transmission. In some examples, the beacon control privilege may correspond to a same account (e.g., the beacon control privilege of an account may allow enabling and/or disabling a beacon for the same account) and/or may correspond to a different account (e.g., the beacon control privilege of one account may allow enabling and/or disabling a beacon for a different account). For example, the electronic device 102 and/or a host device may enable or disable a beacon in response to a command, instruction, or request associated with an account that includes a beacon control privilege corresponding to the beacon to be enabled or disabled. In some examples, the first account 106 may include a different beacon control privilege relative to the second account 110. For example, the first account 106 may include a beacon control privilege 108 without the second account 110 including a beacon control privilege. In some examples, the beacon control privilege 108 may allow enabling and/or disabling the second beacon 114 for the second account. For example, the first account may have a greater beacon control privilege 108 than the second account. For instance, a command, instruction, and/or request associated with the first account 106 may be executed by the electronic device 102 to enable or disable the second beacon 114 for the second account. In some examples, the beacon control privilege 108 of the first account 106 may allow enabling and/or disabling the first beacon 112 for the first account and the second beacon 114 for the second account 110, while a beacon control privilege of the second account 110 may allow enabling and/or disabling the second beacon 114 (but not the first beacon 112).

A sounding privilege may be a capability to control (e.g., activate and/or deactivate) sounding from the electronic device 102 and/or from a host device that includes the electronic device 102. Sounding may be a sound, audio alert, ringing, tone, etc. For example, the electronic device 102 and/or a host device may perform sounding (e.g., output a sound, audio alert, ringing, tone, etc.) in response to a command, instruction, or request associated with an account that includes a sounding privilege. When sounding is activated, for example, the electronic device 102 (or a host device that includes the electronic device 102) may output a sound, audio alert, ringing, tone, etc. For example, the electronic device 102 may include a speaker or speakers for outputting the sound, audio alert, ringing, tone, etc. Sounding may assist a user in finding the electronic device 102. An example of sounding may include proximity ringing. Proximity ringing may be a sound that depends on a proximity of another device. For instance, a sound may be output when a remote device is within a range (e.g., wireless communication range), and/or a sound may change based on a degree of proximity of the remote device. In some examples, the second account 110 may include a different sounding privilege relative to the first account 106. For example, the second account 110 may include a sounding privilege without the first account 106 including a sounding privilege.

A locking privilege may be a capability to control access to (e.g., lock and/or unlock) the electronic device 102 and/or a host device that includes the electronic device 102. For example, the electronic device 102 and/or a host device may be locked by disabling access (e.g., login, input to, output from, etc.) of the electronic device 102 and/or host device. Unlocking may enable (e.g., re-enable) access of the electronic device 102 and/or the host device. In some examples, the electronic device 102 and/or a host device may lock or unlock in response to a command, instruction, or request associated with an account that includes a locking privilege. In some examples, the first account 106 may include a different locking privilege relative to the second account 110. For instance, the first account 106 may include a locking privilege without the second account 110 including a locking privilege.

A wiping privilege may be a capability to control wiping of the electronic device 102 and/or of a host device that includes the electronic device 102. Wiping may include deleting and/or removing stored data. For example, the electronic device 102 and/or a host device may wipe some or all stored data in response to a command, instruction, or request associated with an account that includes a wiping privilege. For instance, wiping may be performed to protect stored data when the electronic device 102 or a host device is stolen and/or cannot be located. In some examples, the first account 106 may include a different wiping privilege relative to the second account 110. For instance, the first account 106 may include a wiping privilege without the second account 110 including a wiping privilege.

An input and output instruction modification privilege may be a capability to modify input and output instructions (e.g., BIOS instructions). For example, the electronic device 102 and/or a host device may modify input and output instructions (e.g., change and/or update a BIOS version) in response to a command, instruction, or request associated with an account that includes an input and output instruction modification privilege. In some examples, the first account 106 may include a different input and output instruction modification privilege relative to the second account 110. For instance, the first account 106 may include an input and output instruction modification privilege without the second account 110 including an input and output instruction modification privilege.

An encryption privilege may be a capability to activate or deactivate encryption and/or hashing for data corresponding to an account. For example, the electronic device 102 and/or a host device may activate or deactivate encryption and/or hashing for an account (e.g., signaled data corresponding to an account, stored data corresponding to an account, etc.) in response to a command, instruction, or request associated with an account that includes an encryption privilege. In some examples, the first account 106 may include a different encryption privilege relative to the second account 110. For instance, the first account 106 may include an encryption privilege without the second account 110 including an encryption privilege.

In some examples, the electronic device 102 may include a receiver to receive a signal or signals. For example, the receiver may be coupled to an antenna or antennas of the electronic device 102 and/or of a host device to receive a wireless signal. In some examples, a received signal may correspond to the first account 106 or to the second account 110. For example, a received signal may be addressed to a device with a device identifier of the first account 106 or the second account 110. In some examples, the received signal may include or indicate a command, instruction, or request to perform an operation. For instance, a received signal may include a command, instruction, or request to enable or disable a locating function, to enable or disable a beacon (e.g., the first beacon 112 or the second beacon 114), to enable or disable encryption corresponding to an account (e.g., the first account 106 or second account 110), to activate sounding (e.g., an audio alert, proximity ringing, etc.), to lock or unlock the electronic device 102 (and/or a host device), to wipe (e.g., delete stored data on) the electronic device 102 (and/or on a host device), and/or to modify input and output (e.g., BIOS) instructions, etc.

In some examples, the electronic device 102 may include a processor to perform an operation based on a received signal. For example, the electronic device 102 may include a processor to enable or disable the second beacon 114 based on a received signal associated with the first account 106. In some examples, the electronic device 102 may verify that a received command, instruction, or request corresponds to an account with a privilege that allows execution of the command, instruction, or request. In some examples, the electronic device 102 may verify that the corresponding account does not include the corresponding privilege and deny executing the command, instruction, or request. In some examples, the electronic device 102 may verify that the corresponding account includes the corresponding privilege and may execute the command, instruction, or request.

In some examples, first beacon 112 access may be separated from second beacon 114 access. Beacon access may be signal formatting that may impact the accessibility (e.g., ability to receive, interpret, decode, etc.) of a beacon. For example, the first beacon 112 may be encoded with a first encoding that is different from a second encoding of the second beacon 114 to separate the first beacon 112 access from the second beacon 114 access. For instance, a remote device may be able to decode the first beacon 112 (without being able to decode the second beacon 114), or a remote device may be able to decode the second beacon 114 (without being able to decode the first beacon 112). In some examples, the first beacon 112 includes encryption to separate the first beacon 112 access from the second beacon 114 access. For instance, the first beacon 112 may include encryption, and the second beacon 114 may be transmitted without encryption or with a different encryption than that of the first beacon 112. In some examples, a remote device may be able to receive the second beacon 114 without being able to decrypt the first beacon 112. In some examples, the first beacon 112 access may be separated from second beacon 114 access based on the different device identifiers. For example, a remote device may receive the first beacon 112 that includes a first device identifier, and may disregard the second beacon 114 because the second beacon 114 does not include the first device identifier (and/or includes a different second device identifier). In some examples, different signal formatting and/or protocols may be utilized to separate first beacon 112 access from second beacon 114 access. For example, the first beacon 112 may be sent using a different protocol relative to the second beacon 114 (e.g., Wi-Fi relative to Bluetooth). Other techniques (e.g., spread spectrum, frequency hopping, etc.) may be utilized to separate beacon access in some examples.

In some examples, two beacons or more and/or two accounts or more may be utilized. For example, two, three, four, or more accounts with corresponding beacons may be utilized in accordance with the techniques described herein.

In some examples, the electronic device 102 may include additional components and/or some of the components described herein may be removed and/or modified without departing from the scope of this disclosure. In some examples, the electronic device 102 may include a processor and/or a memory. The processor may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory. The processor may fetch, decode, and/or execute instructions stored in the memory. The memory may be any electronic, magnetic, optical, or other physical storage device that contains or stores electronic information (e.g., instructions and/or data). Thus, the memory may be, for example, Random Access Memory (RAM), Electrically Erasable Programmable Read-Only Memory (EEPROM), Dynamic Random Access Memory (DRAM), magnetoresistive random-access memory (MRAM), phase change RAM (PCRAM), memristor, flash memory, a storage device, and/or an optical disc, etc. In some examples, the memory may be a non-transitory tangible machine-readable storage medium, where the term "non-transitory" does not encompass transitory propagating signals. The processor may be in electronic communication with the memory. In some examples, a processor and/or memory of the electronic device 102 may be combined with or separate from a processor (e.g., CPU) and/or memory of a host device.

In some examples, the electronic device 102 may include an input/output interface (not shown) through which the electronic device 102 may communicate with an external device or devices (not shown). The input/output interface may include hardware and/or machine-readable instructions to enable the processor to communicate with the external device or devices. The input/output interface may enable a wired or wireless connection to the external device or devices. In some examples, the input/output interface may further include a network interface card and/or may also include hardware and/or machine-readable instructions to enable the processor to communicate with various input and/or output devices, such as a keyboard, a mouse, a display, another apparatus, electronic device, computing device, etc., through which a user may input instructions and/or indications into the electronic device 102.

Figure 2:
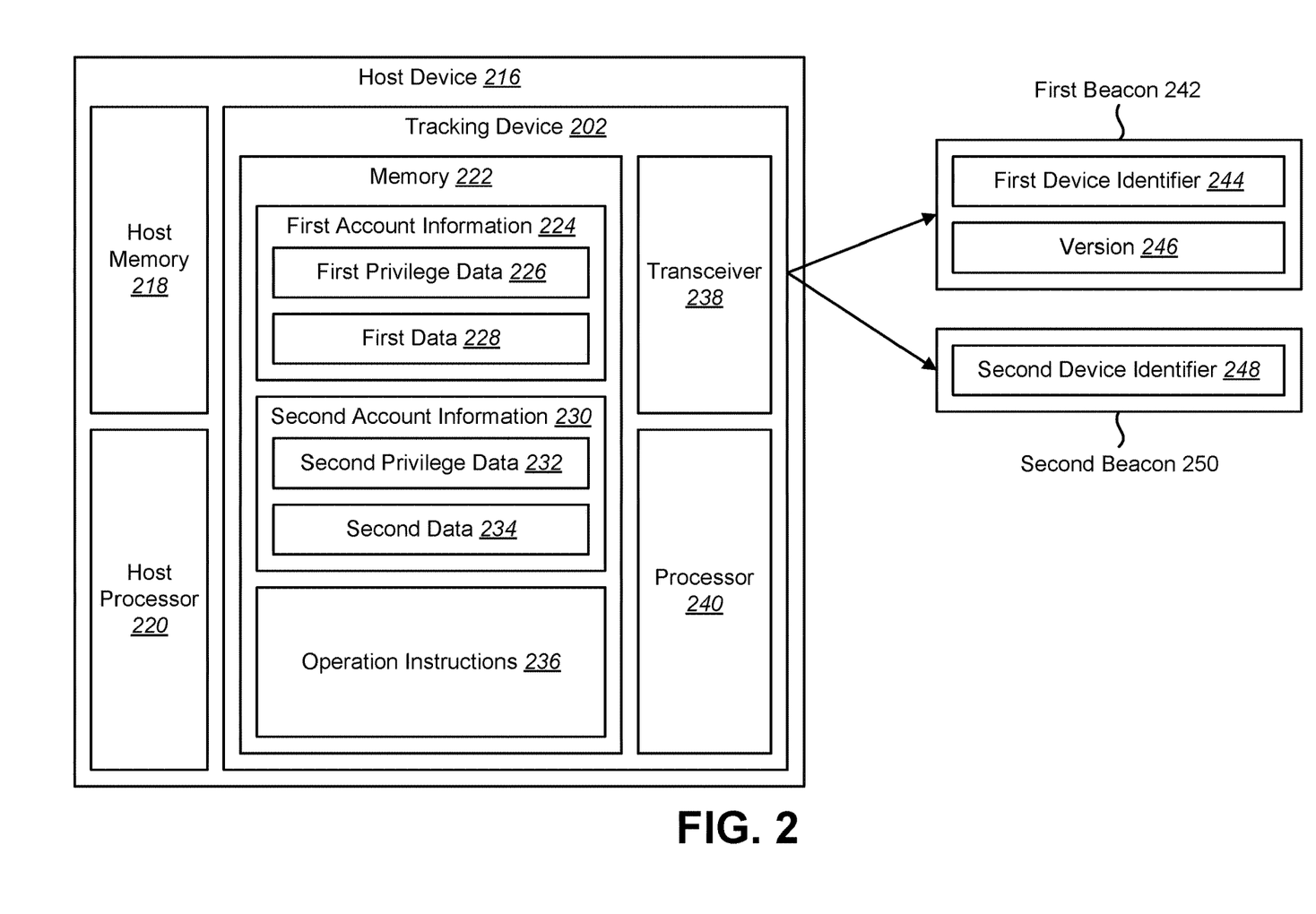
FIG. 2 is a block diagram of an example of a tracking device that may be utilized for beacon transmission.

FIG. 2 is a block diagram of an example of a tracking device 202 that may be utilized for beacon transmission. The tracking device 202 may be a device that can be tracked with wireless signaling. For example, the tracking device 202 may transmit a beacon or beacons for locating and/or tracking the tracking device 202. Some examples of the tracking device 202 include Bluetooth trackers and/or wireless communications devices that send data (e.g., location data, coordinate data, etc.) for location and/or tracking functionality. In some examples, the tracking device 202 of FIG. 2 may be an example of the electronic device 102 as described in FIG. 1. In some examples, the tracking device 202 may perform one, some, or all of the functions, operations, elements, procedures, etc., described in one, some, or all of FIG. 1-4.

In some examples, the tracking device 202 may be embedded in and/or coupled to a host device 216. As used herein, the term "embedded in" may mean that an element or device may be included in and/or integrated into another element or device. As used herein, the term "coupled to" may mean that an element or device is attached to or connected to another element or device. For example, the tracking device 202 may be plugged into the host device 216, may be socketed into the host device 216, may be soldered to the host device 216, and/or may be integrated into another component that is plugged into the host device 216, socketed into the host device 216, and/or soldered to the host device 216. In some examples of embedding, the tracking device 202 may be capable of being functional independent of the host device 216, may be separable (e.g., non-destructively separable) from the host device 216, may be removable from the host device 216, and/or may be capable of being plugged into and/or socketed into another device or devices. In some examples, the tracking device 202 may be pluggable and/or attachable for plugging into or attaching to the host device 216 and/or another device. In some examples, the host device 216 may host (e.g., include, house, and/or provide power for) the tracking device 202. In some examples, the host device 216 may include the tracking device 202, host memory 218, and/or a host processor 220. Examples of the host device 216 may include laptop computers, tablet devices, game consoles, smartphones, etc.

In some examples, the tracking device 202 may include memory 222 and/or a processor 240. The memory 222 may be separate from the host memory 218 in some examples. The processor 240 may be separate from the host processor 220 in some examples. In some examples, the memory 222 and the host memory 218 may be a single memory device for the host device 216 and the tracking device 202. In some examples, the processor 240 and the host processor 220 may be a single processor for the host device 216 and the tracking device 202. The processor 240 may be in electronic communication with the memory 222. In some examples, the memory 222 may include operation instructions 236. The processor 240 may execute the operation instructions 236 to perform an operation or operations. For example, the processor 240 may execute the operation instructions 236 to change first account information 224 (e.g., first privilege data 226 and/or first data 228), change second account information 230 (e.g., second privilege data 232 and/or second data 234), enable or disable a beacon, activate or deactivate locating, perform sounding, lock or unlock (the tracking device 202 and/or the host device 216), wipe stored data (in the host memory 218 and/or memory 222), and/or modify input and output instructions in accordance with a received command, instruction, and/or request as described herein.

The memory 222 may store first account information 224 and second account information 230. In some examples, the first account information 224 may be an example of the first account 106 and/or may be information corresponding to the first account 106 described in FIG. 1. In some examples, the second account information 230 may be an example of the second account 110 and/or may be information corresponding to the second account 110 described in FIG. 1.

In some examples, the first account information 224 may include first privilege data 226 and/or first data 228. The first privilege data 226 may be information that indicates a privilege or privileges corresponding to the first account information 224. For example, the first privilege data 226 may include data indicating whether the first account information 224 includes a locating privilege, a beacon control privilege, a sounding privilege, a locking privilege, a wiping privilege, an input and output instruction modification privilege, and/or an encryption privilege. In some examples, the first privilege data 226 may include data indicating whether a second account beacon is enabled or disabled. The first data 228 may be data corresponding to the first account information 224. For example, the first data 228 may include a first device identifier, a first account status (e.g., active or inactive), an account type (e.g., administrative or subordinate), an input and output instruction (e.g., BIOS) version, a lock status, and/or an encryption status.

In some examples, the second account information 230 may include second privilege data 232 and/or second data 234. The second privilege data 232 may be information that indicates a privilege or privileges corresponding to the second account information 230. For example, the second privilege data 232 may include data indicating whether the second account information 230 includes a locating privilege, beacon control privilege, a sounding privilege, a locking privilege, a wiping privilege, an input and output instruction modification privilege, and/or an encryption privilege. The second data 234 may be data corresponding to the second account information 230. For example, the second data 234 may include a first device identifier, a second account status (e.g., active or inactive), and/or an account type (e.g., administrative or subordinate).

Table (1) provides an example of privileges that may be indicated by the first privilege data 226 and/or the second privilege data 232.

TABLE 1

| Privilege | First Account Information | Second Account Information |
|---|---|---|
| Locating | Yes | Yes |
| Sounding | No | Yes |
| Lock and Wipe | Yes | No |
| Input/Output Instruction Modification | Yes | No |
| Beacon Control (Second Account) | Yes (Enabled) | Not applicable |

As can be observed in Table (1) a second account information 230 may include a different sounding privilege relative to the first account information 224, the first account information 224 may include a different locking privilege and/or a different wiping privilege relative to the second account information 230, and/or the first account information 224 may include a different input and output modification privilege relative to the second account information 230.

In some examples, the processor 240 may determine whether beacon transmission associated with a second account is enabled based on the first account information 224. For example, the processor 240 may read the first account information 224 (e.g., first privilege data 226, data indicating whether a second account beacon is enabled or disabled) to determine whether beacon transmission associated with a second account is enabled.

In some examples, the tracking device 202 may include a transceiver 238. The transceiver 238 may include a transmitter to transmit wireless signals and/or may include a receiver to receive wireless signals. The transmitter may be an example of the transmitter described in FIG. 1. In some examples, the transceiver 238 may be included in the tracking device 202. In some examples, the transceiver 238 may be included in the host device 216 and not in the tracking device 202. In some examples, the transceiver 238 (e.g., transmitter) may transmit the first beacon 242 and/or the second beacon 250. For instance, the transceiver 238 (e.g., transmitter) may transmit a second beacon 250 associated with a second account in a case that beacon transmission associated with the second account is enabled. For example, if the processor 240 determines that beacon transmission associated with the second account is enabled, the processor 240 may control the transmitter to transmit the second beacon 250. In some examples, the transceiver (e.g., transmitter) may transmit a first beacon 242 associated with a first account. In a case that beacon transmission associated with the second account is disabled, the transmitter may disable transmitting the second beacon 250 and/or may discontinue transmitting the second beacon 250.

In some examples, the transceiver 238 (e.g., receiver) may receive a command, instruction, and/or request signaled from a remote device. A command, instruction, and/or request may be associated with an account (e.g., a first account, a second account, etc.). In some examples, the processor 240 may execute the received command, instruction, and/or request in accordance with the privilege(s) (e.g., first privilege data 226 or second privilege data 232) associated with an account. For example, the processor 240 may, if permitted by the privilege(s) associated with an account, enable or disable a beacon, activate or deactivate locating, perform sounding, lock or unlock (the tracking device 202 and/or the host device 216), wipe stored data (in the host memory 218 and/or memory 222), set encryption (and/or hashing), and/or modify input and output instructions based on a received command, instruction, and/or request. In an example, a first account may have a beacon control privilege indicated by the first privilege data 226. If a command, instruction, or request associated with the first account to enable or disable the second beacon 250 is received, the processor may enable or disable the second beacon 250 based on the received signal associated with the first account. In another example, a first account may have a different wiping privilege relative to a second account, where the first account may have a wiping privilege without the second account having a wiping privilege. The processor 240 may initiate a wiping operation of the host memory 218 in response to a received command associated with the first account. If a command associated with the second account to wipe host memory 218 is received, the processor 240 may deny performing the wiping operation for the second account (without an associated wiping privilege) in this example.

In some examples, the first beacon 242 and the second beacon 250 may include different information. For example, the first beacon 242 may include a first device identifier 244 and the second beacon may include a second device identifier 248 that is different from the first device identifier as described in FIG. 1. In some examples, the first beacon 242 may indicate an input and output instruction version 246 as described in FIG. 1. In some examples, information included in the first beacon 242 may be obtained from the first data 228. In some examples, information included in the second beacon 250 may be obtained from the second data 234. Table (2) provides an example of different information that may be included in the first beacon 242 relative to the second beacon 250.

TABLE 2

| First Beacon | Second Beacon |
|---|---|
| Device Identifier: 1982342604834527 | Device Identifier: 45673256787654456 |
| Account Status: Active | Account Status: Active |
| Account Type: Administrative | Account Type: Subordinate |
| Version: BIOS 3.5.1.2 | |
| Lock Status: Unlocked | |
| Encryption Status: Enabled | |

In some examples, first beacon 242 access may be separated from second beacon 250 access. For example, the first beacon 242 may be encoded with a first encoding that is different from a second encoding of the second beacon 250 to separate the first beacon access from the second beacon access as described in FIG. 1. In some examples, the processor 240 may perform the different encodings for the first beacon 242 and the second beacon 250. In some examples, the first beacon 242 may include encryption and/or hashing to separate the first beacon access from the second beacon access as described in FIG. 1. In some examples, the processor 240 may perform different encryption and/or hashing for the first beacon 242 and/or the second beacon 250.

Figure 3:
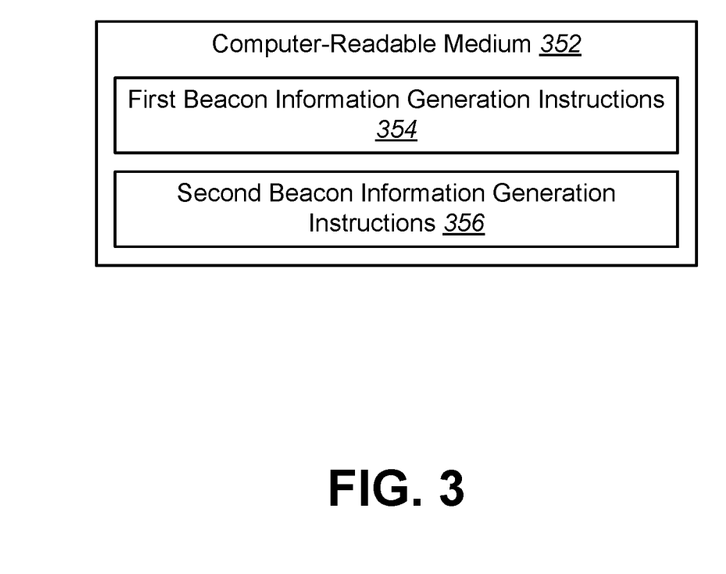
FIG. 3 is a block diagram illustrating an example of a computer-readable medium for controlling beacon transmission.

FIG. 3 is a block diagram illustrating an example of a computer-readable medium 352 for controlling beacon transmission. The computer-readable medium 352 may be a non-transitory, tangible computer-readable medium 352. The computer-readable medium 352 may be, for example, RAM, EEPROM, a storage device, an optical disc, and the like. In some examples, the computer-readable medium 352 may be volatile and/or non-volatile memory, such as DRAM, EEPROM, MRAM, PCRAM, memristor, flash memory, and the like. In some examples, the computer-readable medium 352 described in FIG. 3 may be an example of the memory 222 described in FIG. 2 or memory described in FIG. 1. In some examples, code (e.g., data and/or executable code or instructions) of the computer-readable medium 352 may be transferred and/or loaded to memory or memories of an electronic device and/or tracking device.

The computer-readable medium 352 may include code (e.g., data and/or executable code or instructions). For example, the computer-readable medium 352 may include first beacon information generation instructions 354 and/or second beacon information generation instructions 356.

In some examples, the first beacon information generation instructions 354 may be instructions when executed cause a processor of an electronic device to generate first beacon information associated with a first account. For example, a processor may generate first beacon information by reading first account information (e.g., first privilege data and/or first data) from memory (e.g., from the computer-readable medium 352) and formatting (e.g., encoding, encrypting, and/or modulating, etc.) the information for transmission. In some examples, the first account may include second beacon permission information. Second beacon permission information may be information that indicates whether a second beacon corresponding to a second account may be transmitted. In some examples, the first account information may include an input and output instruction version.

In some examples, the second beacon information generation instructions 356 may be instructions when executed cause a processor of an electronic device to generate second beacon information associated with a second account based on the second beacon permission information. For example, if the second beacon permission information indicates that a second beacon corresponding to the second account may be transmitted, a processor may generate second beacon information by reading second account information (e.g., second privilege data and/or second data) from memory (e.g., from the computer-readable medium 352) and formatting (e.g., encoding, encrypting, and/or modulating etc.) the information for transmission.

In some examples, the first beacon information includes a first device identifier and the second beacon information includes a different second device identifier. For instance, the first beacon and the second beacon may include different device identifiers as described in FIG. 1 and/or FIG. 2.

In some examples, the first beacon information indicates an input and output instruction version. For instance, the first beacon may include an input and output instruction version as described in FIG. 1 and/or FIG. 2. In some examples, the second beacon may be transmitted without an input and output instruction version.

In some examples, the first beacon information may be included in a first beacon that may be transmitted. In some examples, the second beacon information may be included in a second beacon that may be transmitted. For instance, a transmitter of an electronic device may transmit the first beacon and/or the second beacon.

Figure 4:
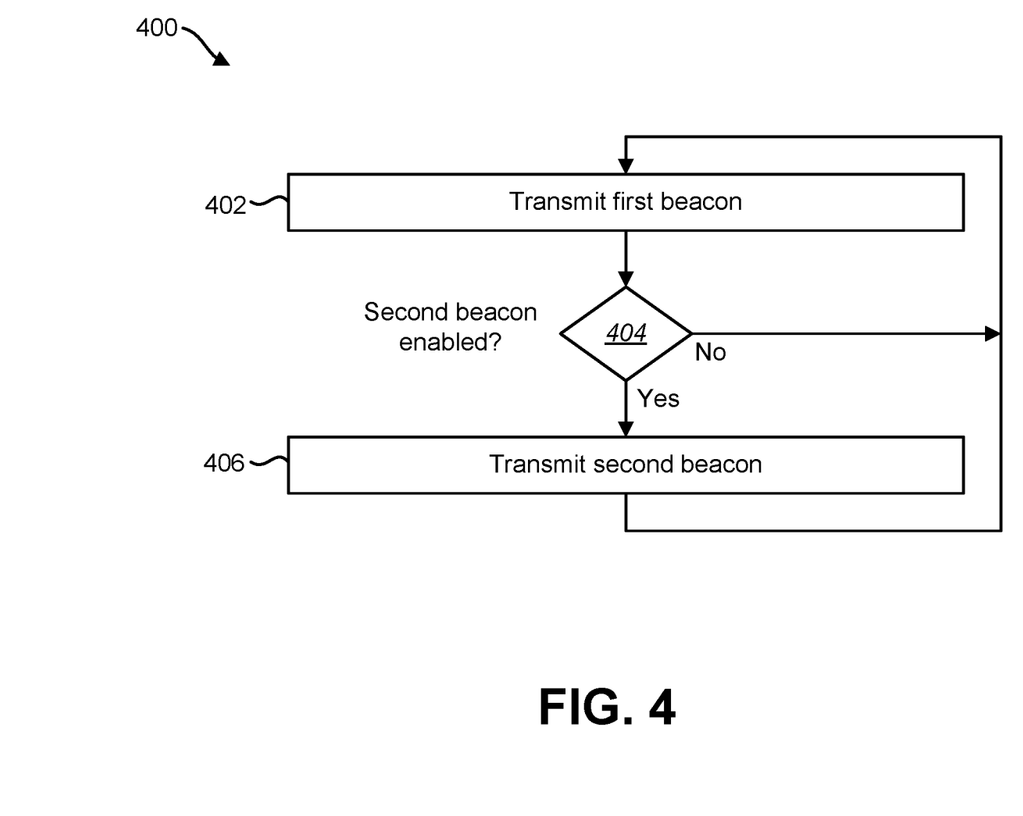
FIG. 4 is a flow diagram illustrating an example of a method for controlling beacon transmission.

FIG. 4 is a flow diagram illustrating an example of a method 400 for controlling beacon transmission. For instance, the method 400 may provide an approach for transmitting multiple beacons for separate accounts. The method 400 and/or an element or elements of the method 400 may be performed by an electronic device. For example, the method 400 may be performed by the electronic device 102 described in FIG. 1, the tracking device 202 described in FIG. 2, and/or the host device 216 described in FIG. 2, any of which may be referred to generally as an "electronic device" in FIG. 4. In some examples, the method 400 may be performed using an instruction or instructions described in FIG. 3. In some examples, the method 400 may be performed by an electronic device (e.g., a tracking device, a Bluetooth device, an IoT device, a wireless communication device, etc.). For instance, the electronic device may activate (e.g., power up, wake up, boot up, etc.) after an initial power on.

An electronic device may transmit 402 a first beacon. In some examples, transmitting 402 a first beacon may be performed as described in FIG. 1, FIG. 2, and/or FIG. 3.

The electronic device may determine 404 whether a second beacon is enabled. In some examples, this may be accomplished as described in FIG. 1, FIG. 2, and/or FIG. 3. For example, the electronic device may read first account information to determine whether a second beacon corresponding to a second account is enabled. In a case that the second beacon is not enabled, the electronic device may return to transmitting 402 the first beacon.

In a case that the second beacon is enabled, the electronic device may transmit 406 a second beacon. In some examples, this may be accomplished as described in FIG. 1, FIG. 2, and/or FIG. 3.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
a transmitter to:
transmit a first tracking signal to track a target device, wherein the first tracking signal is associated with a first user account; and
transmit a second tracking signal to track the target device, wherein the second tracking signal is associated with a second user account, wherein the first user account comprises a different tracking signal control privilege relative to the second user account.

2. The electronic device of claim 1, further comprising a processor to enable or disable the second tracking signal based on a received signal associated with the first user account.

3. The electronic device of claim 1, wherein the first tracking signal comprises a first device identifier and the second tracking signal comprises a second device identifier that is different from the first device identifier.

4. The electronic device of claim 1, wherein first tracking signal access is separated from second tracking signal access.

5. The electronic device of claim 4, wherein the first tracking signal is encoded with a first encoding that is different from a second encoding of the second tracking signal to separate the first tracking signal access from the second tracking signal access.

6. The electronic device of claim 4, wherein the first tracking signal includes encryption to separate the first tracking signal access from the second tracking signal access.

7. The electronic device of claim 1, wherein the second user account comprises a different sounding privilege relative to the first user account.

8. The electronic device of claim 1, wherein the first user account comprises a different locking privilege or a different wiping privilege relative to the second user account.

9. The electronic device of claim 1, wherein the first user account comprises a different input and output instruction modification privilege relative to the second user account.

10. A tracking device, comprising:
a memory to store first user account information and second user account information;
a processor in electronic communication with the memory, wherein the processor is to:
determine enablement of a tracking signal transmission associated with a second user account based on the first user account information; and
upon determining the enablement of the second user account, send a command to a transmitter to transmit a tracking signal associated with the second user account to track a target device; and
send a command to the transmitter to transmit a tracking signal associated with a first user account to track the target device, wherein the first user account comprises a different tracking signal control privilege relative to the second user account.

11. The tracking device of claim 10, wherein the tracking device is embedded in or coupled to a host device.

12. The tracking device of claim 10, wherein the first user account has a different wiping privilege relative to the second user account, and wherein the processor is to initiate a wiping operation of a host memory in response to a received command associated with the first user account.

13. A non-transitory tangible computer-readable medium comprising instructions when executed cause a processor of an electronic device to:
generate first tracking signal information to track a target device associated with a first user account, wherein the first user account comprises second tracking signal permission information; and
generate second tracking signal information to track the target device associated with a second user account based on the second tracking signal permission information, wherein the first user account comprises a different tracking signal control privilege relative to the second user account.

14. The non-transitory tangible computer-readable medium of claim 13, wherein the first tracking signal information comprises a first device identifier and the second tracking signal information comprises a different second device identifier.

15. The non-transitory tangible computer-readable medium of claim 13, wherein the first tracking signal information indicates an input and output instruction version.

* * * * *